United States Patent [19]

Mita et al.

[11] 4,367,495
[45] Jan. 4, 1983

[54] METHOD AND APPARATUS FOR MAGNETIC RECORDING AND REPRODUCTION OF DIGITAL SIGNAL

[75] Inventors: Seiichi Mita; Yasuhiro Hirano, both of Hachioji; Yoshizumi Eto, Sagamihara, all of Japan

[73] Assignee: Hitachi Denshi Kabushiki Kaisha, Tokyo, Japan

[21] Appl. No.: 197,572

[22] Filed: Oct. 16, 1980

[30] Foreign Application Priority Data

Oct. 17, 1979 [JP] Japan .................................. 54-132943

[51] Int. Cl.³ .............................................. G11B 5/09
[52] U.S. Cl. ......................................... 360/39; 360/40
[58] Field of Search ............................... 360/39, 40, 51

[56] References Cited

U.S. PATENT DOCUMENTS 4,195,318  3/1980  Price et al. ............................ 360/39
4,234,898  11/1980  Nakagawa et al. .................... 360/40

*Primary Examiner*—Vincent P. Canney
*Attorney, Agent, or Firm*—Antonelli, Terry and Wands

[57] ABSTRACT

Magnetic recording and reproducing method and apparatus for digital signals. An input binary digital signal is converted into an intermediate signal series by a precoder having a delay circuit for two-time slot delay and a modulo-2 adder. The intermediate signal series is branched to two paths. One signal on one path is delayed by one time slot and subtracted from the other signal on the other path to produce a recording signal to be recorded on a recording medium. A signal reproduced from the recording medium is branched to two paths. One signal on one path is delayed by one time slot and added to the other signal on the other path. The added signal is decoded to produce a binary signal which corresponds to the input binary digital signal.

6 Claims, 12 Drawing Figures

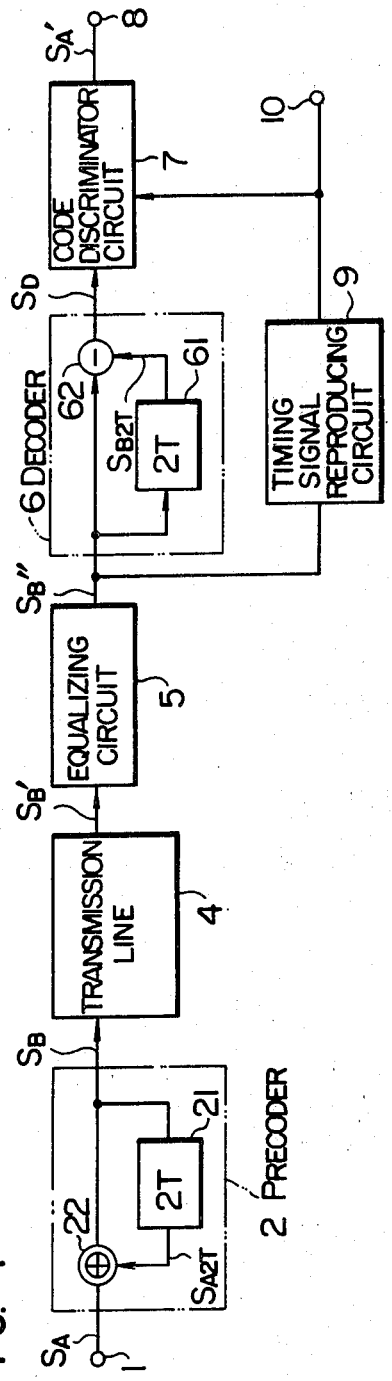
F I G. 1
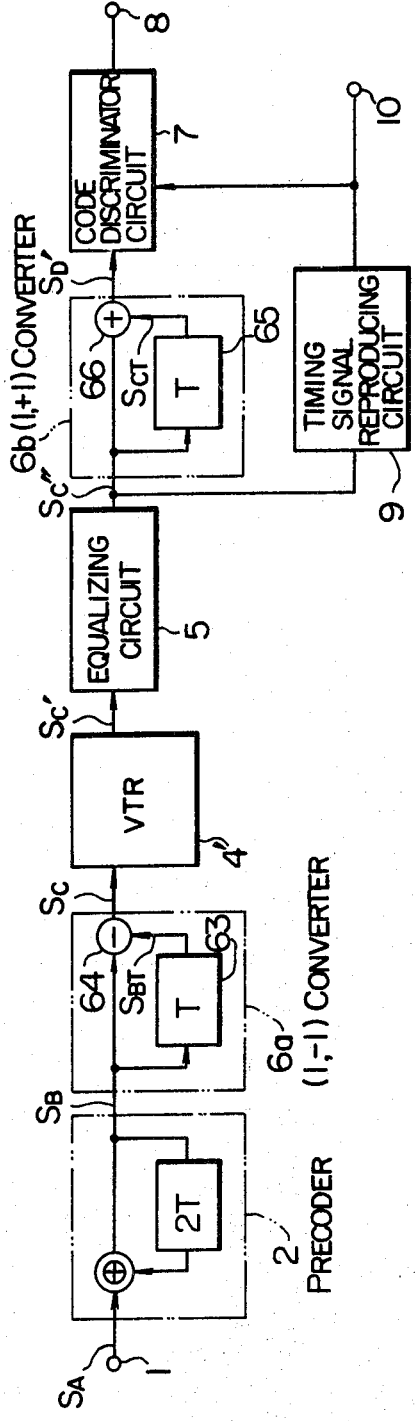
F I G. 3

METHOD AND APPARATUS FOR MAGNETIC RECORDING AND REPRODUCTION OF DIGITAL SIGNAL

The present invention relates to method and apparatus for magnetic recording and reproduction of digital signals and in particular, it is concerned with a digital signal recording and reproducing system suitable for use with a magnetic recording and reproducing apparatus using a transformer as a signal transmission line.

In an apparatus for recording and reproducing video signals such as a VTR which incorporates a rotary head, signal transmission between a magnetic head built in a rotor and an external recording circuit or playback circuit is carried out via a rotary transformer.

When a digitized signal, especially, a digital signal in the NRZ format containing DC components is desired to be recorded and reproduced with this type of magnetic recording and reproducing apparatus using the transformer as the signal transmission line, the DC components in the signal are blocked by the transformer with the result that current level in the magnetic head fluctuates dependent on the arrangement of pulses, thus making it difficult to discriminate codes in the reproducing circuit.

According to a conventional approach to this problem, as proposed in a magnetic recording system disclosed in Japanese Patent application laid-open No. 128133/77, one bit of recording current applied to the magnetic head is constituted by one or more pairs of opposite-polarity master and slave pulses wherein the product of amplitude and duration time is made equal for each of the pulses and the amplitude of the slave pulse is minimized.

The conventional approach, however, disadvantageously broadens the frequency bandwidth of signal since one original pulse is converted into a plurality of pulses for recording on a recording medium and for this reason, it becomes sensitive to noise and requires a complicated signal processing circuit for the pulse conversion.

Accordingly, it is an object of the present invention to provide a novel magnetic recording and reproducing method which is suitably adapted to a magnetic recording and reproducing apparatus with the transformer and which can solve the conventional problems set forth above.

Another object of the present invention is to provide a magnetic recording and reproducing apparatus which can prevent transmission and amplification of errors in code even when such errors occur during processing digital signals.

To accomplish the above objects, the present invention is featured by applying the well known signal conversion technique of a partial response system using (1, 0, −1) format to the magnetic recording and reproduction in such a way that a binary input digital signal is converted into an intermediate signal series by a precoder having a delay circuit for two-time slot delay and a modulo-2 adder, the intermediate signal series is subjected to a (1, −1) conversion and recorded in a recording medium, and a reproduction signal from the recording medium is subjected to a (1, +1) conversion and decoded into a ternary signal corresponding to the input digital signal. This ternary signal is recovered by a code discriminator circuit to the original, binary input digital signal.

In notation of the signal conversion (X, Y, Z) referred to herein, "X" represents a signal f(t) at time t, "Y" a signal f(t-T) which is delayed in relation to the signal f(t) by one time slot whose duration is T, and "Z" a signal f(t-2T) which is delayed in relation to the signal f(t) by 2T. Accordingly, the notation (1, 0, −1) denotes a signal conversion of f(t)−f(t-2T), the notation (1, −1) a signal conversion of f(t)−f(t-T), and the notation (1, +1) a signal conversion of f(t)+f(t-T).

The foregoing and other objects, advantages, manner of operation and novel features of the present invention will be understood from the following detailed description when read in conjunction with the accompanying drawings, in which:

FIG. 1 is a block diagram useful in explaining the partial response signal conversion using (1, 0, −1) format;

FIG. 3 is a block diagram of one embodiment of the present invention;

Figure 2:
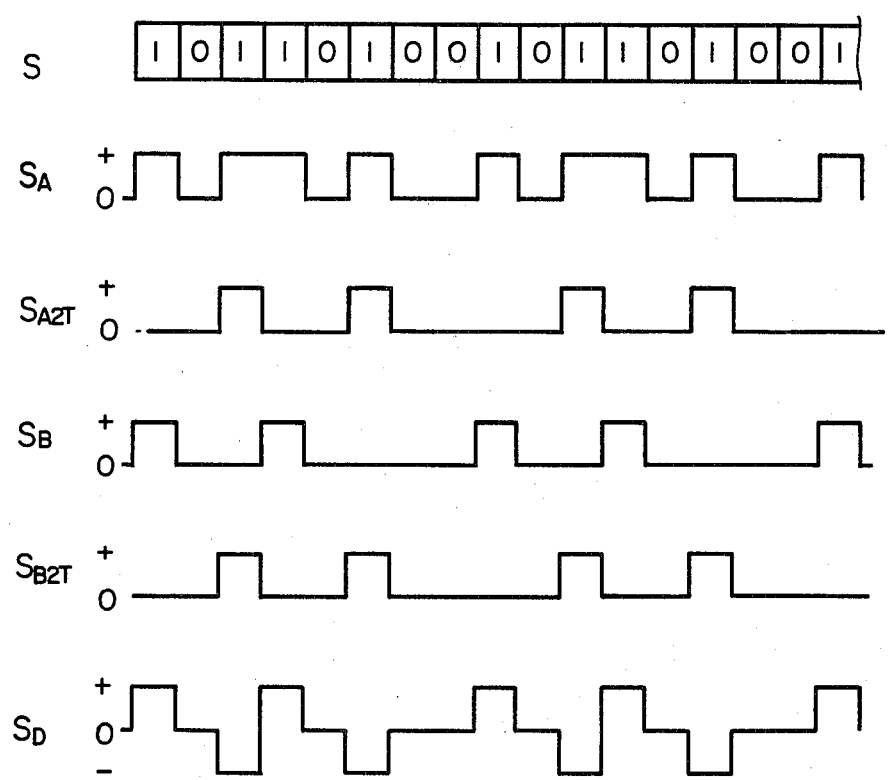
FIG. 2 is a timing chart for explaining the operation of the FIG. 1 signal conversion.

Prior to describing a preferred embodiment of the present invention, for better understanding thereof, the signal processing based on a general partial response system using a (1, 0, −1) format will be explained by making reference to FIGS. 1 and 2.

A partial response signal conversion system as shown in FIG. 1 comprises an input terminal 1 applied with an input digital signal, a precoder 2 adapted to convert the input digital signal to an intermediate signal series, a transmission line 4, and equalizing circuit 5, a decoder circuit 6 adapted to effect a (1, 0, −1) conversion of the signal, a code discriminator circuit 7, an output terminal 8 for delivery of a reproduction digital signal, a timing signal reproducing circuit 9, and an output terminal for delivery of a timing signal. The precoder 2 includes a signal delay circuit 21 adapted to delay the input digital signal by two time slots 2T, where T is a time slot width of signal transmission, and a modulo-2 adder 22. The decoder circuit 6 includes a signal delay circuit 61 for two-time slot delay and a subtractor 62.

Applied to the input terminal 1 is a digital data in the form of a pulse signal $S_A$ of the NRZ format such as composed of "1" and "0" bits as shown at S in FIG. 2. The modulo-2 adder 22 contained in the precoder 2 is constituted by an exclusive OR (EXOR) circuit which produces an output of "0" when a sum of two inputs is even and an output of "1" when the sum is odd. When the pulse signal $S_A$ is passed through the precoder 2, "1" bits of the pulse signal $S_A$ are cancelled out by "1" bits of an output $S_{A2T}$ from the signal delay circuit 21 so that the pulse signal $S_A$ is converted into an intermediate signal series as shown at $S_B$ in FIG. 2.

Frequency response of the intermediate pulse signal $S_B$, especially at high frequency band is degraded when the pulse signal $S_B$ passes through the transmission line 4. As the rate of data transmission becomes high, such degradation of the pulse signal is aggravated, giving rise to an increased intersymbol interference and consequent errors in discrimination of codes. The equalizing circuit 5 corrects the frequency response of the pulse signal $S_B$ passed through the transmission line in such a manner that the frequency response satisfies Nyquist condition, in other words, all of the equivalent waveforms are made zero at adjacent sampling time points.

As a result of the correction for the phase or frequency response of the pulse signal at the equalizing circuit 5, an output signal $S_B''$ of the equalizing circuit 5 has increased noises on its high frequency components especially near Nyquist frequency fo which is $\frac{1}{2}T$. In particular, when the transmission line 4 is replaced by a magnetic recording apparatus, a reproduced signal $S_B'$ from the magnetic head is differentiated to remove DC component and nearby frequency components from the signal $S_B'$. But since the equalizing circuit 5 compensates for such low frequency components, noises at low frequency band are increased.

Although erroneous discrimination of codes are due to two causes as described above, errors in the output $S_B''$ of the equalizing circuit 5 can be reduced by passing the output $S_B''$ through the decoder circuit 6.

The decoder circuit 6 branches the pulse signal $S_B''$ to two paths, one branched signal being directly coupled to a subtractor 62 and the other being delayed by two time slots at a delay circuit 61 to be converted into a signal $S_{B2T}$ and then coupled to the subtractor 62. The decoder circuit 6 has a signal transfer function of $2|\sin \omega T|$ and is generally known as a $(1, 0, -1)$ conve rsion circuit. As will be seen from the signal transfer function, the decoder circuit 6 eliminates frequency components near DC and Nyquist frequency and produces an output signal $S_D$ removed of noise components within these frequency bands which is a ternary pulse train as shown at $S_D$ in FIG. 2.

Since "+1" and "−1" in the pulse signal $S_D$ correspond to "1" in the original, input pulse train $S_A$ of the NRZ format, it is possible to obtain, at the output terminal 8, a pulse signal $S_A'$ which is identical to the original, input pulse by judging ternary levels of the pulse signal $S_D$ at the code discriminator circuit 7.

By employing the partial response system using the $(1, 0, -1)$ format wherein the first signal conversion is carried out at the modulo-2 adder, errors in transmission code caused by the transmission path subsequent to the precoder 2 can advantageously be prevented from being amplified.

The present invention makes full use of advantages of the signal conversion pursuant to the partial response system, for reducing errors in video data occurring during recording and reproducing the video data in a video magnetic recording and reproducing apparatus. The output of the precoder 2 contains DC component as will be seen from the waveform $S_B$ in FIG. 2. Accordingly, when the transmission line 4 in FIG. 1 is simply replaced by a video data recording section of VTR composed of rotary transformer, magnetic head, magnetic tape and so on, the DC level of current flowing through the magnetic head fluctuates in accordance with the pattern of the pulse signal $S_B$, resulting in fluctuating recording current. On the other hand, the frequency response of the reproduction signal from the magnetic tape varies with the magnitude of the recording current. Therefore, when the output of the precoder 2 is directly coupled to the rotary transformer, the frequency response of the reproduction signal fluctuates in accordance with the binary pattern of the recorded data, causing non-linear intersymbol interference and a proper equivalent waveform cannot be obtained from the equalizing circuit 5, thus giving rise to errors in code discrimination.

According to the present invention, the $(1, 0, -1)$ conversion is divided into a $(1, -1)$ conversion and a $(1, +1)$ conversion. More particularly, as shown in FIG. 3, while an output signal $S_B$ of a precoder 2 is applied to a video data recording section 4' via a $(1, -1)$ converter circuit 6a, a reproduction signal $S_C''$ delivered out of an equalizing circuit 5 is decoded through a $(1, +1)$ converter circuit 6b and then applied to a code discriminator circuit 7.

Figure 4:
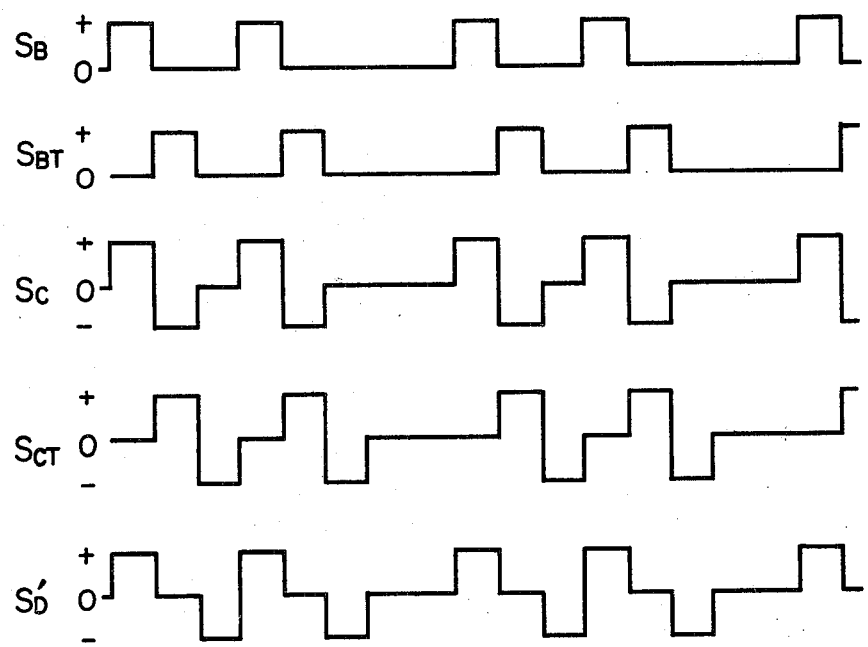
FIG. 4 is a timing chart for explaining the operation of the embodiment shown in FIG. 3.

The $(1, -1)$ converter circuit 6a includes a delay circuit 63 for one time slot delay and a subtractor 64, and has a signal transfer function of $2|\sin (\omega T/2)|$. Accordingly, when passed through the circuit 6a, the output signal $S_B$ of the precoder 2 can be removed of DC component and a ternary DC-balanced pulse as shown at $S_C$ in FIG. 4 can be produced from the $(1, -1)$ converter circuit 6a. The pulse signal $S_C$ obviously assures recording of magnetic data with current of uniform DC level.

A reproduction signal $S_C'$ from the data recording section 4' is equalized at the equalizing circuit 5 which in turn produces an output $S_C''$ which is applied to the $(1, +1)$ converter circuit 6b and a timing signal reproducing circuit 9. Circuit constants of the equalizing circuit 5 are substantially the same as those for the binary recording.

Figure 5:
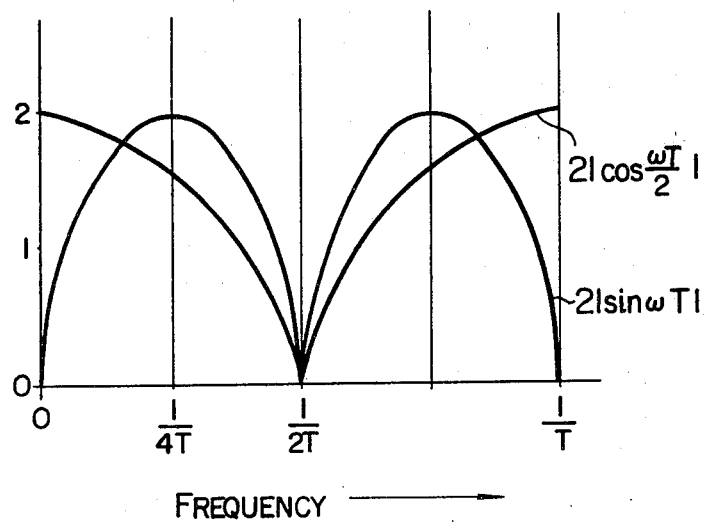
FIG. 5 is a graphic representation of circuit characteristics of converter circuits (6a, 6b)

The $(1, +1)$ converter circuit 6b includes a delay circuit 65 for one time slot delay and an adder 66, and has a signal transfer function of $2|\cos (\omega T/2)|$. Since this transfer function has a pole at Nyquist frequency fo $(=\frac{1}{2}T)$ as shown in FIG. 5, an output $S_D'$ from the $(1, +1)$ conversion circuit 6b is removed of noises at the nearby Nyquist frequency as in the $(1, 0, -1)$ conversion. As shown at $S_D'$ in FIG. 4, "+1" and "−1" in the output signal $S_D'$ correspond to "1" in the original, input pulse $S_A$ of the NRZ format and the output signal $S_D'$ has the same waveform as the output from the decoder circuit 6 shown in FIG. 1.

Figure 6:
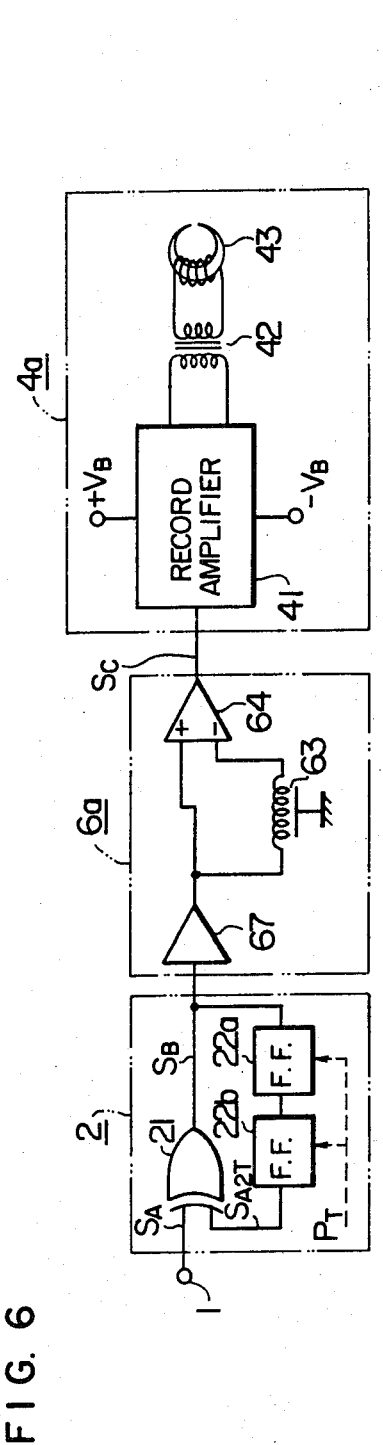
FIG. 6 is a circuit diagram showing details of a signal recording section (2, 6a, 4') in FIG. 3.
Figure 7:
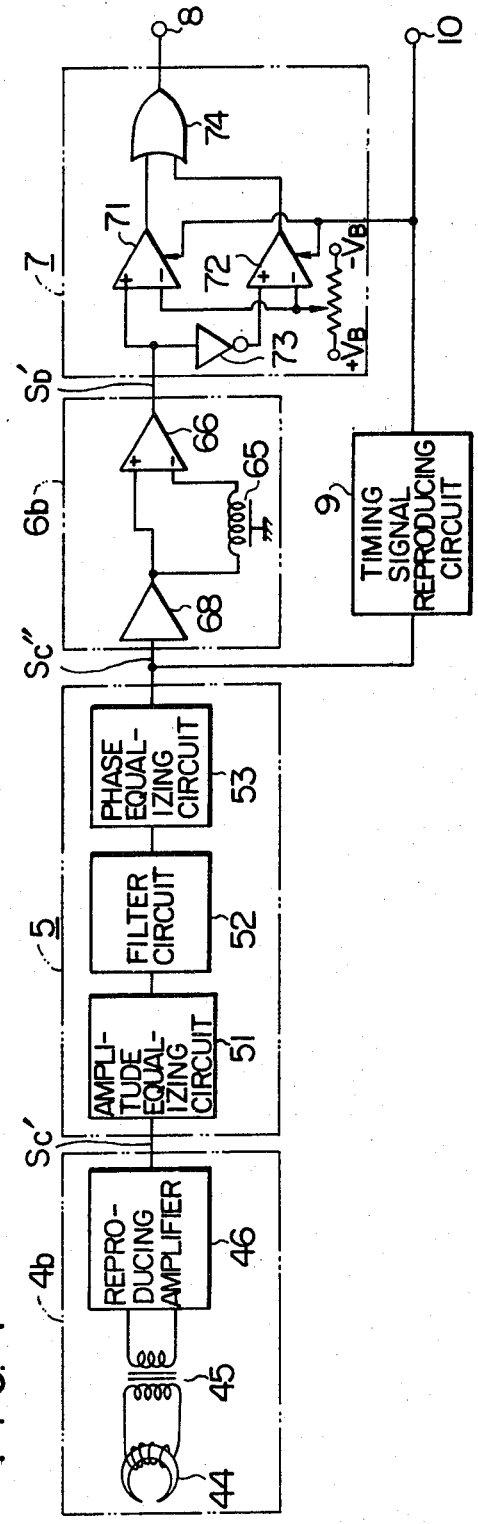
FIG. 7 is a circuit diagram showing details of a signal reproduction section (4', 5' 6b, 7, 9) in FIG. 3.

Referring to FIGS. 6 and 7, an example of circuit construction of VTR incorporating the invention will be described.

Figure 8:
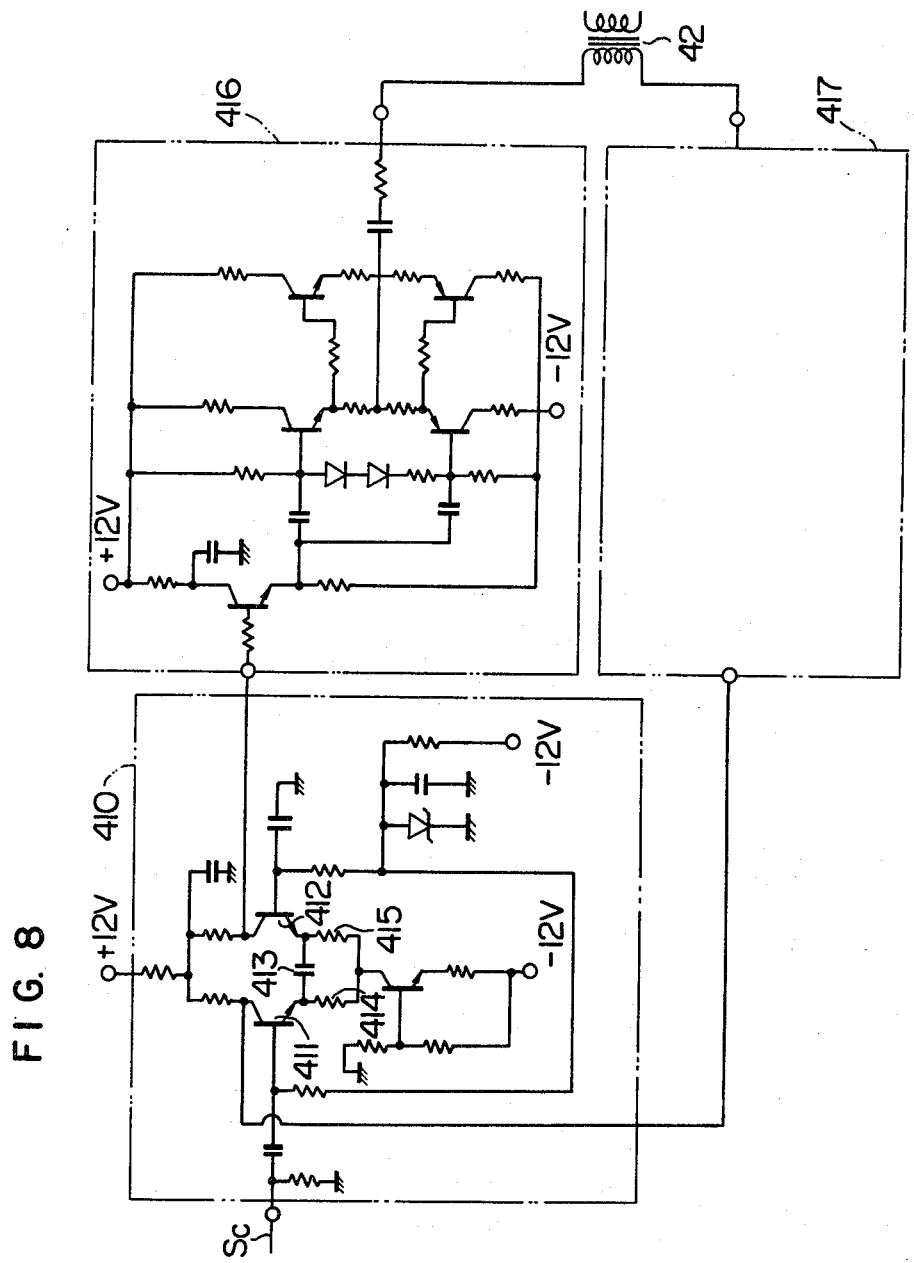
FIG. 8 is a circuit diagram showing details of a recording amplifier (41) in FIG. 6.

In a signal recording section as shown in FIG. 6, a TV video signal coded into digital form is applied, along with an error correction code and the like, to an input terminal 1 at a period of T. An input pulse train $S_A$ at the input terminal 1 is coupled to one input terminal of an EXOR circuit 21. Coupled to the other input terminal of the EXOR circuit 21 is a signal $S_{A2T}$ which is an output signal $S_B$ of the EXOR delayed by 2T in relation to the input pulse $S_A$ through two stages of D type flip-flop circuit 22a, 22b respectively driven by a drive pulse $P_T$. A $(1, -1)$ converter circuit 6a comprises a buffer amplifier 67, an analog delay element 63 for delaying the signal by a delay of T such as for example a coaxial cable, and a differential amplifier 64 whose output is coupled to a record amplifier 41. A recording circuit 4a of VTR comprising the record amplifier 41, a rotary transformer 42 and a magnetic head 43 has the same basic construction as that of a general VTR recording circuit for recording an FM modulated signal except that the frequency band of the record amplifier 41 is broadened in view of the recording density. The record amplifier 41 is detailed in FIG. 8. As shown in FIG. 8, the output signal $S_C$ of the $(1, -1)$ converter circuit 6a is coupled to a differential amplifier 410. The differential amplifier 410 includes transistors 411 and 412 having the emitters connected to a differentiating circuit, comprised of a capacitor 413 and resistors 414 and 415, and the collectors respectively coupled to amplifiers 417 and 416 of the same construction. Accordingly, the amplifier circuits 416 and 417 receive opposite polarity signals resulting from differentiating the signal $S_C$ and apply output signals across the primary winding of the rotary transformer 42.

Figure 9:
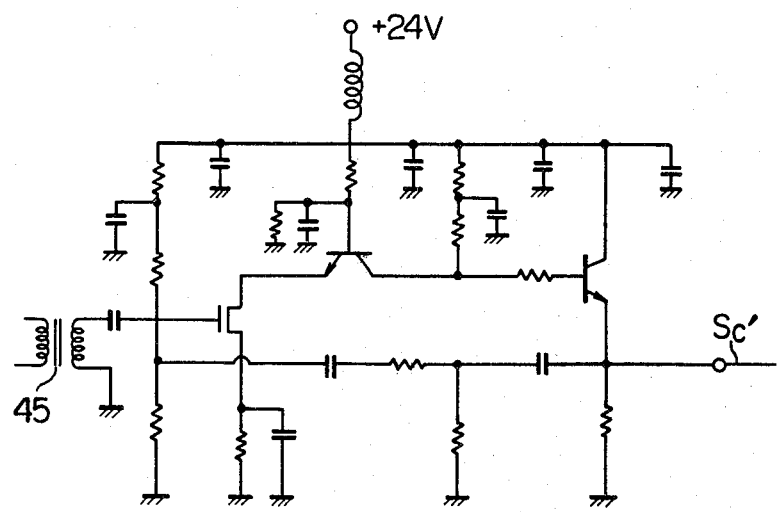
FIG. 9 is a circuit diagram showing details of a reproducing amplifier (46) in FIG. 7.
Figure 10:
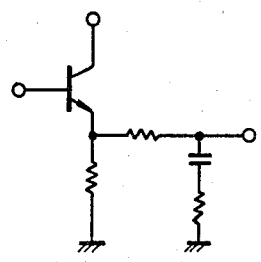
FIGS. 10 and 11 are circuit diagrams of components in an equalizing circuit (5)
Figure 11:
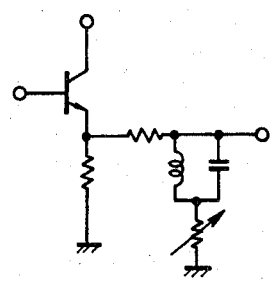

Turning to FIG. 7 illustrative of a signal reproducing section, a circuit 4b comprising a magnetic head 44, a rotary transformer 45 and a reproducing amplifier 46 has the same construction as that of a general VTR reproducing circuit for the reproduction of an FM modulation signal except that the frequency band of the reproducing amplifier 46 is broadened. The reproducing amplifier 46 is detailed in FIG. 9. An equalizing circuit 5 comprises an amplitude equalizing circuit 51 for correcting the degradation in frequency response at low and high frequency bands, a filter circuit 52 and a phase equalizing circuit 53 for correcting the signal delay distortion caused in the preceding circuits 51 and 52. The amplitude equalizing circuit 51 includes an integrator circuit as shown in FIG. 10 which corrects the degradation in frequency response at low frequency band resulting from differentiating characteristics of the magnetic head, and a plurality of circuits as shown in FIG. 11 which are connected in tandem for correcting the degradation in frequency response at high frequency band resulting from various losses.

A $(1, +1)$ converter circuit 6b includes a buffer amplifier 68, a coaxial cable 65 for delaying the signal by T, and an adder circuit 66 for adding outputs from the buffer amplifier and the coaxial cable.

Figure 12:
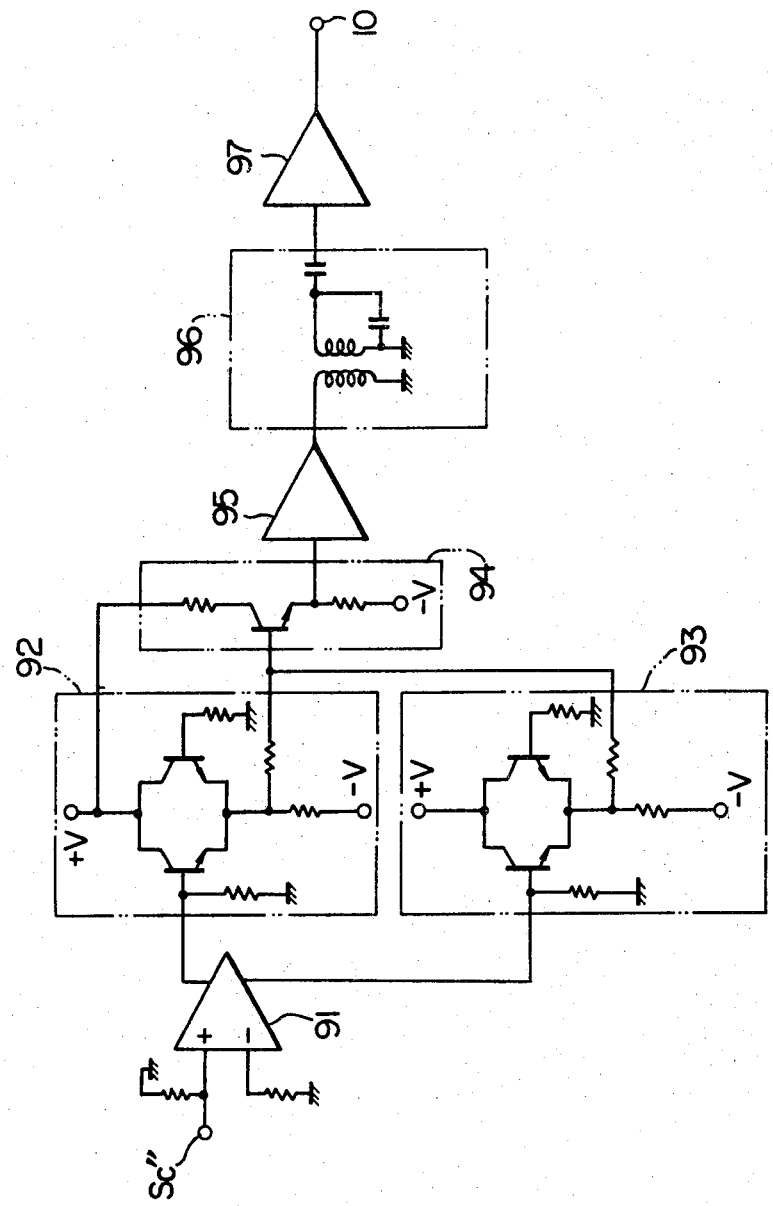
FIG. 12 is a circuit diagram showing details of a timing signal reproducing circuit (9).

A timing signal reproducing circuit 9 as specified in FIG. 12 comprises a differential amplifier 91 which receives the output signal $S_C''$ from the equalizing circuit 5, rectifier circuits 92 and 93 for rectifying positive and negative output signals from the differential amplifier 91, respectively, an adder circuit 94 for adding output signals from the two rectifier circuits, an amplifier 95 for amplifying an output signal from the adder circuit 94, a helical reasonator 96 which oscillates at a frequency corresponding to a period of T in synchronism with the output signal of the amplifier 95, and an amplifier circuit 97 for amplifying an output from the resonator 96.

A code discriminator circuit 7 includes two voltage comparators 71 and 72 whose outputs are connected to an OR circuit 74. The voltage comparator 71 has one input terminal applied with the output signal $S_D'$ of the converter circuit 6b and the other applied with a reference voltage. The voltage comparator 72 has one input terminal applied with the output signal $S_D'$ via an inverter 73 and the other applied with the reference voltage. These two voltage comparators 71 and 72 operate in synchronism with the output pulse from the timing signal reproducing circuit 9. With this construction, "+1" pulse detected by the comparator 71 and "−1" pulse detected by the comparator 72 are both delivered in the form of "1" to an output terminal 8 via the OR circuit 74. Thus, the NRZ pulse train $S_A$ applied to the input terminal 1 can be reproduced ultimately.

As has been described, the magnetic recording and reproducing system according to the present invention can eliminate the affect of DC component blocking due to the rotary transformer since the input pulse to the magnetic recording section is of DC balance type, and can prevent the amplification of erroneous code and assure high S/N signals since the full use of advantages accruing from the signal conversion based on the partial response system are made. Consequently, the system of the present invention can advantageously be applied to the magnetic recording and reproducing apparatus such as VTR wherein the video signal converted into digital signals are recorded and reproduced.

What is claimed is:

1. A magnetic recording method for digital signals, comprising:
    a first step of producing a series of intermediate binary digital signals by sequentially subjecting to a modulo-2 summation each of input binary digital signals which are received in accordance with a predetermined time slot format and an intermediate binary digital signal which is produced through the previous modulo-2 summation made to one of said input binary digital signals preceding by two time slots to the input binary digital signal to be presently subjected to the modulo-2 summation;
    a second step of converting said series of intermediate binary digital signals into a series of ternary digital signals by sequentially subtracting from each of said intermediate binary digital signals the intermediate binary digital signal which is preceding thereto by one time slot; and
    a third step of transmitting said series of ternary digital signals to a magnetic head with a transformer for recording on a magnetic recording medium.

2. A method of reproducing a magnetic recording signal recorded through a first step of producing an intermediate binary digital signal series by sequentially subjecting to a modulo-2 summation an input binary digital signal received in accordance with a predetermined time slot format and an intermediate binary digital signal preceding the one input binary digital signal by two time slots, a second step of producing a ternary digital signal series by sequentially subtracting a first binary signal obtained in said first step from a second binary signal obtained in said first step, said first binary signal preceding said second binary signal by one time slot, and a third step of recording the signal series obtained in said second step on a magnetic recording medium, wherein said method comprises a fourth step of sequentially reading the ternary signal series from said magnetic recording medium, a fifth step of adding a first ternary signal obtained in said fourth step and a second ternary signal obtained in said fourth step, said first ternary signal preceding said second ternary signal by one time slot, and a sixth step of discriminating the ternary signal obtained in said fifth step and converting it into a third binary signal.

3. A method according to claim 2, wherein said fourth step includes equalizing the ternary signal read out of the recording medium so that the frequency response of said ternary signal satisfies Nyquist condition.

4. An apparatus for recording digital signals on a magnetic recording medium and reproducing the recorded digital signals, comprising:

- first means including a modulo-2 adder and a first delay element which holds an output of said modulo-2 adder for two time slots of a predetermined time slot format, and producing an intermediate binary signal series by sequentially subjecting to said modulo-2 adder an input binary digital signal received by the first means in accordance with the predetermined time slot format and an binary digital signal which is deribed from said first delay element;
- second means including a second delay element which holds an applied signal for one time slot, and producing one ternary signal series by sequentially subtracting a first binary signal produced from said first means from a second binary signal produced from said first means, said first binary signal preceding said second binary signal by one time slot and being delayed by said second delay element;
- third means for recording the output from the second means on the magnetic recording medium;
- fourth means for reproducing a recorded signal on the magnetic recording medium;
- fifth means including a third delay element which holds an applied signal for one time slot, and producing the other ternary signal series by adding a first output signal from the fourth means and a second output signal from said fourth means, said first output signal preceding said second output signal by one time slot and being delayed by said third delay element; and
- sixth means for discriminating the other ternary signal from the fifth means and converting it into a third binary signal.

5. An apparatus according to claim 4, wherein said fourth means includes means for correcting the frequency response of the signal reproduced from the magnetic recording medium.

6. An apparatus according to claim 4 or 5, further comprising the seventh means for generating a timing signal of the predetermined time slot format in synchronism with the output signal from said fourth means, whereby said sixth means performs the discrimination of the output signal from said fifth means in synchronism with the timing signal from said seventh means.

* * * * *